Patented Jan. 18, 1938

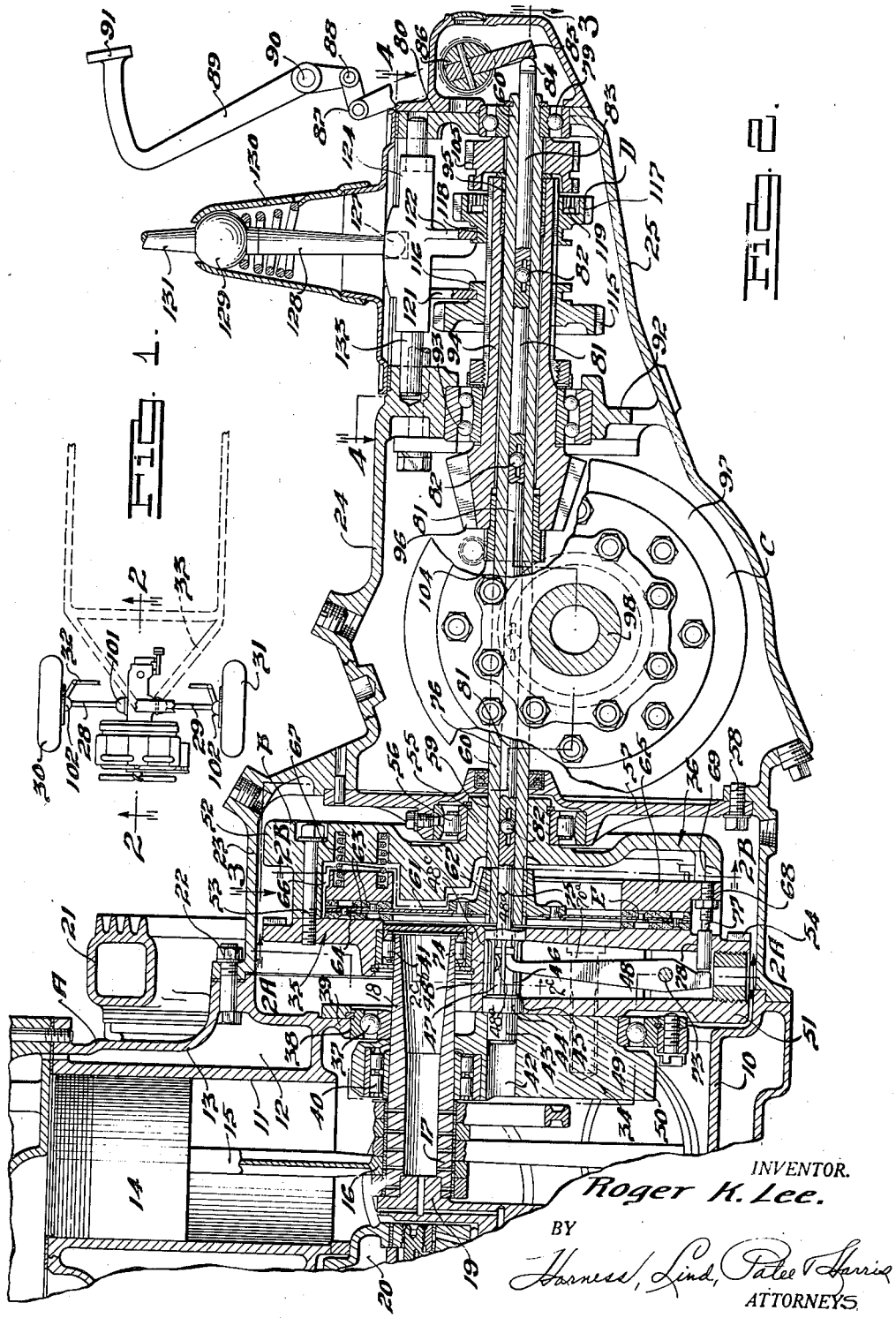

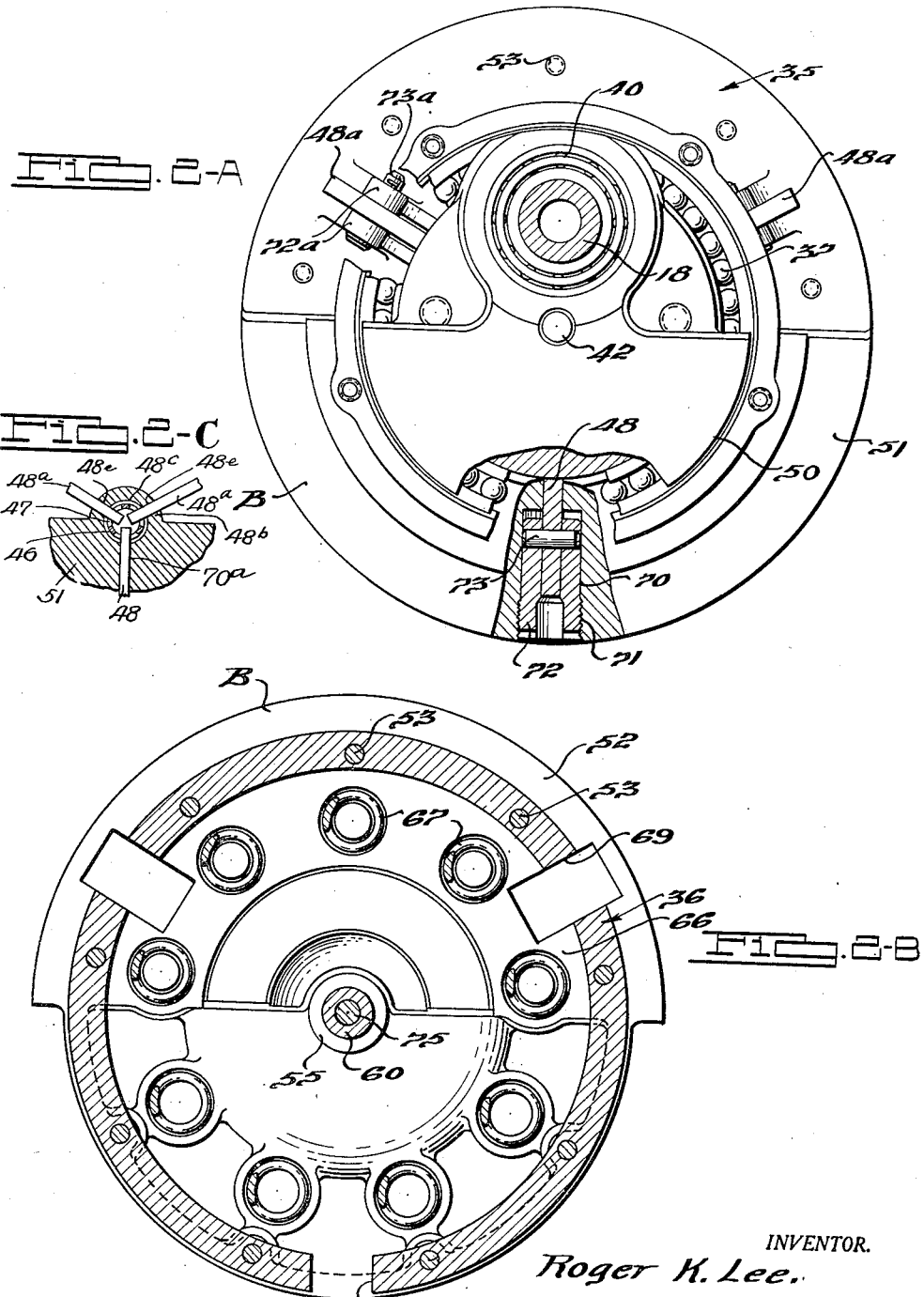

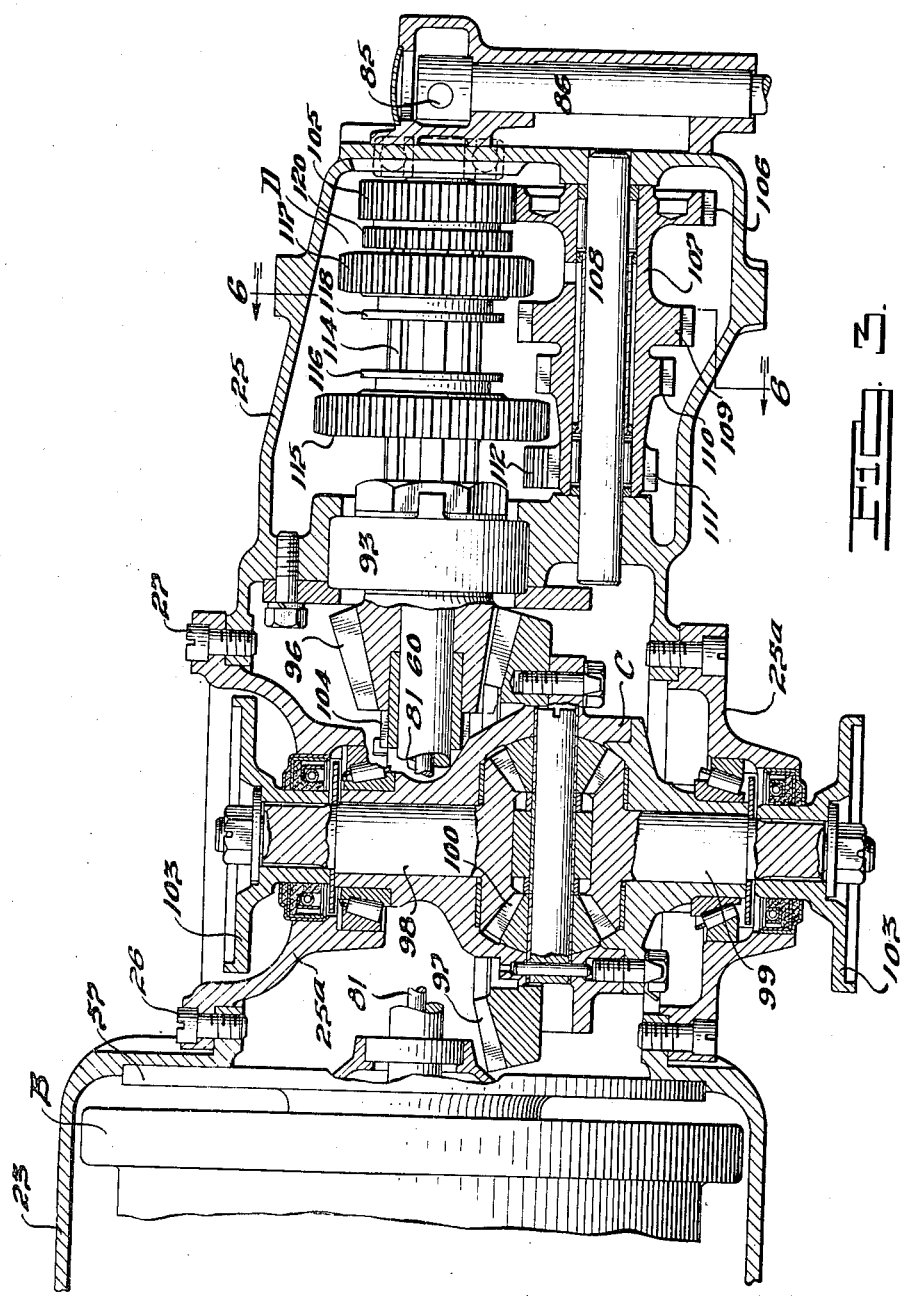

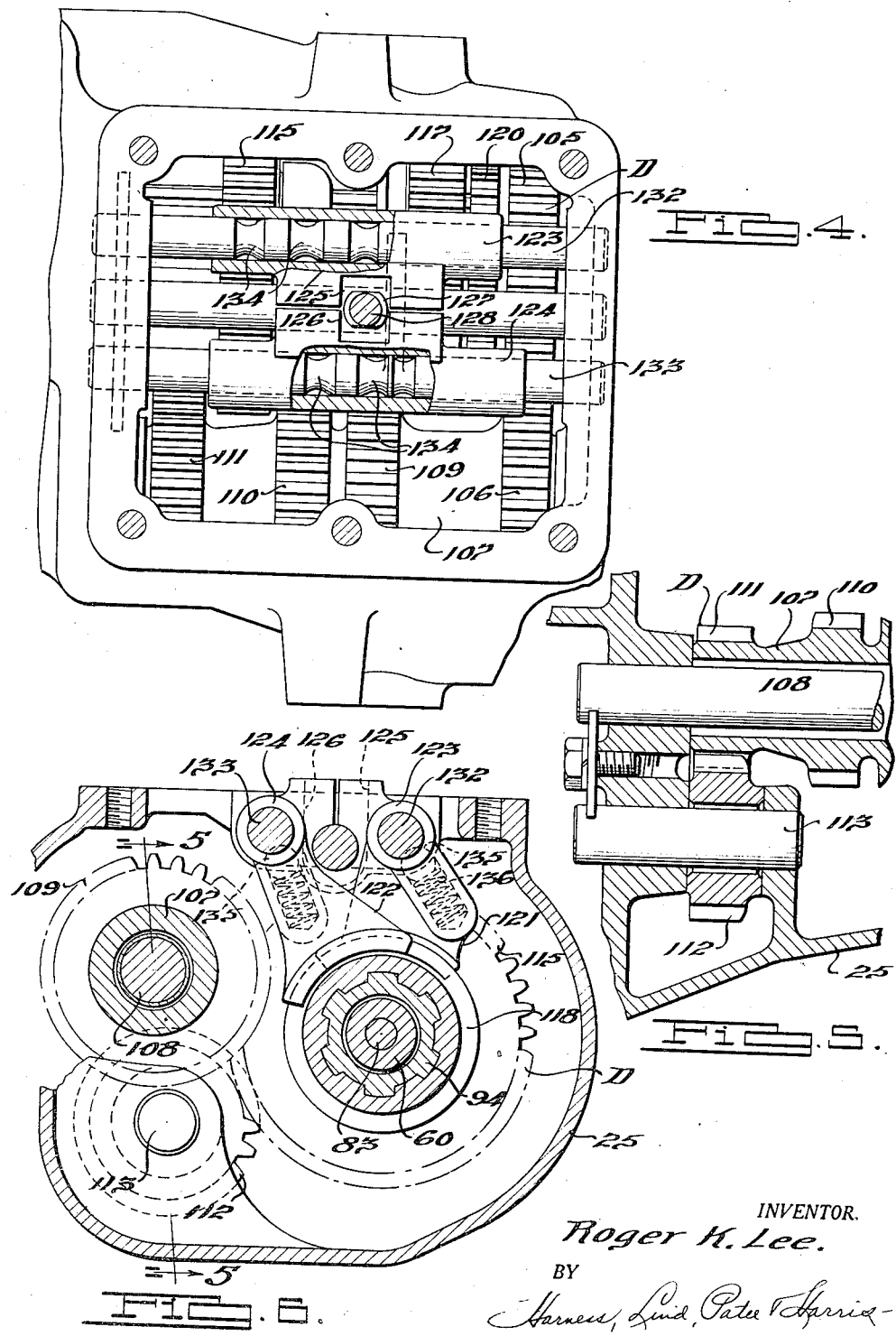

2,105,742

UNITED STATES PATENT OFFICE 2,105,742

MOTOR VEHICLE

Roger K. Lee, Highland Park, Mich., assignor to Chrysler Corporation, Highland Park, Mich., a corporation of Delaware Application February 13, 1936, Serial No. 63,698

24 Claims. (Cl. 74—595)

This invention relates to motor vehicles and refers more particularly to improvements in the development and transmission of power for driving the vehicle.

One feature of my invention relates to improvements in engine crankshafts. In connection with this feature, I have provided an improved crankshaft especially adapted for use with radial engines although not necessarily limited thereto in its broader embodiments.

In my Patents Nos. 2,047,419 and 2,047,420 issued July 14, 1936, I have described and claimed a novel crankshaft structure having a cantilever crank pin especially adapted for use with engines or compressors having radially arranged cylinders. My present invention has among its objects the provision of improvements on such crankshaft structures.

One object of my invention is to provide a novel crankshaft so constructed and arranged to include or house a clutch for controlling the drive from the crankshaft to the mechanism for driving the vehicle ground wheels. Such an arrangement has, among its advantages, the provision of a very compact driving structure of relatively low weight and cost; a structure which also results in a saving in space required for the installation of the power plant. My crankshaft and clutch structure is especially adapted for use with radial engines of the type disclosed in my aforesaid patents, and particularly for vehicle power plant installations for driving the front ground wheels although my improvements may be used to advantage in connection with other types of engines, compressors and the like, and for a variety of uses and locations of power plants.

Another object of my invention is to provide an improved clutch controlling mechanism especially adapted for use with a relatively remote clutch operator, as where the clutch is released by an operating mechanism extending through the speed ratio controlling transmission which may be driven from the engine crankshaft. My improved operating mechanism provides for a gradual reduction in the rubbing speeds of the clutch operating parts from the rotating clutch throw-out member to the stationary manually controlled operator.

A further object of my invention is to provide an improved power plant having a novel compact transmission arrangement especially adapted for a front wheel drive for motor vehicles. My improved power plant preferably also includes the aforesaid radial engine with my novel crankshaft and clutch assembly although many of the novel features of construction and arrangement may be employed with other more conventional types of engines and clutches if so desired.

My improved power plant is so constructed and arranged as to compactly arrange the parts in the interests of minimizing space requirements for the power plant, reduction in weight and a consequent saving in the cost of manufacture of the power plant and vehicle as a whole.

Further objects and advantages of my invention will be more apparent from the following detailed description of one illustrative embodiment, reference being had to the accompanying drawings, in which:

Fig. 1 is a somewhat diagrammatic plan view illustrating my improved power plant and associated motor vehicle front driving wheels.

Fig. 2 is a sectional elevational view longitudinally through the power plant along the line 2—2 of Fig. 1.

Fig. 2—a is a sectional elevational view through the crankshaft, the section being taken as indicated by the line 2a—2a of Fig. 2.

Fig. 2—b is a sectional elevational view through the crankshaft taken as indicated by the line 2b—2b of Fig. 2.

Fig. 2—c is a detail sectional view taken as indicated by line 2c—2c of Fig. 2.

Fig. 3 is a sectional plan view illustrating the rear portion of the power plant, the section being taken as indicated by the line 3—3 of Fig. 2.

Fig. 4 is a sectional plan view illustrating the transmission gearing, the section being taken as indicated by the line 4—4 of Fig. 2.

Fig. 5 is a detail sectional elevational view illustrating the reverse idler gear, the section being taken as illustrated by the line 5—5 of Fig. 6.

Fig. 6 is a transverse sectional elevational view through the transmission gearing, the section being taken as indicated by the line 6—6 of Fig. 3.

Referring to the drawings, I have illustrated the various features of my invention in connection with a water cooled engine having the cylinders thereof disposed radially around the axis of the crankshaft although, as will presently be more apparent, many of the features of my invention are adapted for use in connection with other types of engines, compressors, and the like.

According to the present illustrated embodiment of my invention, the radial engine A is provided with a main crankcase and cylinder casting 10 having a plurality of radially arranged cylinders 11, water jacketed at 12, by reason of the outer cast wall 13, the axes of the cylinders being illustrated as progressively offset longitudinally of the engine. Each cylinder 11 receives a working piston 14 having an operating connecting rod 15 extending radially inwardly to provide a crank pin bearing 16. These crank pin bearings are arranged side by side on the cantilever portion 17 of the rotatable crankshaft spindle or crank pin 18. The particular engine illustrated in part is that which is more fully described and claimed in copending patent application Serial No. 63,697, filed Feb. 13, 1936, and as more particularly set forth in said patent application, the cantilever crank pin portion 17 may be adapted to drive a disc 19 for actuating the valving mechanism in chamber 20 for controlling the admission of fuel mixture to the engine cylinders and the exhaust of gases therefrom to the exhaust manifold 21.

Secured by fasteners 22 to the rear wall 13 of the main engine crankcase casting 10 is a rearwardly extending housing structure 23 adapted to rotatably house the crankshaft and clutch assembly B, the housing 23 having a further rearward extension 24 adapted to house the differential driving mechanism C. The housing portion 24 extends further rearwardly to provide a housing portion 25 for the speed ratio changing mechanism D. Although the housing structures 23, 24 and 25 are shown formed integrally, they may if desired be formed as separate castings suitably secured together. The sides of housing 24 have openings to accommodate bearing support members 25a, these members being secured to the housing by suitable fasteners 26 and 27. In general, the drive from the engine A is taken rearwardly from crankshaft B to the transmission D, then forwardly through the differential gearing C to the laterally extending drive shafts 28, 29 (see Fig. 1) for driving the front ground wheels 30, 31 having any suitable steering mechanism 32 associated therewith. The rearwardly extending motor vehicle frame is diagrammatically illustrated at 33, this frame being more particularly described and claimed in my copending application Serial No. 109,695, filed Nov. 7, 1936. I have furthermore not illustrated the details of suspension for the wheels 30, 31, such arrangement forming the subject matter of my copending application Serial No. 114,193, filed Dec. 4, 1936.

The crankshaft B is preferably built up from a plurality of component parts to facilitate assembly of the crankshaft and the clutch mechanism which is adapted to be built into the crankshaft and housed thereby. Furthermore, the formation of the crankshaft from separate parts provides for a reduction in the cost of the crankshaft since, for example, the front bearing member may be made of bearing steel without requiring the entire crankshaft to be made of this relatively expensive material. Likewise, other parts of the crankshaft may be formed of materials having specifications suitable for their requirements without influence by the requirements of other of the crankshaft parts.

The crankshaft B is formed of three main parts comprising a forward bearing member 34, an intermediate member 35 which forms a portion of the flywheel, and a rear flywheel member 36 which also provides a casing or housing for the clutch which is generally indicated at E. These component crankshaft parts are adapted to be rigidly connected together on their assembly as will be presently apparent.

The forward member 34 provides a front bearing at 37 for the crankshaft, this bearing being preferably of the anti-friction type mounted in a longitudinally extending opening 38 provided in the rear transverse wall 39 of the main casting 10. The member 34 also carries forwardly of the bearing 37, an anti-friction bearing 40 comprising the front bearing for the spindle 18, it being noted that the bearing 40 is disposed forwardly of the bearing 37 and that the spindle 18 is eccentrically journaled with respect to the longitudinal crankshaft axis of rotation, the rearwardly extending end of spindle 18 being rotatably journaled by a similar bearing 41 carried by the crankshaft intermediate member 35. The spindle 18 is thus free to rotate around its axis while driving the crankshaft by reason of the operation of the pistons 14 and the connecting rods 15 which operate on the cantilever portion 17 of the spindle.

Along the axis of member 34 there is provided a bore 42 which receives at the rear end thereof a plug 43 having a forward portion 44 thereof adapted to pilot the intermediate member 35 by reason of the axial bore 45 of the latter, the plug 43 having a rearward cage extension 46 provided with a number of outwardly opening longitudinal slots 47 for receiving the inner ends of the clutch actuating levers 48 and 48a. The intermediate member 35 has a central boss 48b formed with an axial bore 48c for receiving pilot portion 44 of plug 43. This plug has a rear pilot portion 48d which also fits within the bore 48c at the rear end thereof. Registering radially with the slots 47 are the longitudinally elongated openings 48e in boss 48b, these openings also respectively accommodating the inner ends of the levers 48a. The lever 48 enters one of the slots 47 through an opening in the crankshaft counterweight means as will presently be more apparent. The members 34 and 35 are connected together by a plurality of suitable fasteners, one of which is illustrated in Fig. 2 at 49.

The crankshaft members 34 and 35 are provided with counterweighting portions 50 and 51, respectively, each of these counterweighting portions extending approximately 180 degrees in the present embodiment and as best shown in Fig. 2—a. The centers of mass of the counterweights 50, 51 are disposed diametrically opposite the spindle 18 for counterweighting the reciprocating parts acting on the spindle, as well as the forces of centrifugal force acting on the spindle itself. Inasmuch as it is not possible to locate the counterweights 50, 51 directly opposite the resultant of the spindle forces, a couple is set up longitudinally of the crankshaft and in order to provide a neutralizing couple, the flywheel member 36 is counterweighted at 52. The center of mass of counterweight 52 is diametrically opposite the centers of mass of the counterweights 50, 51. The crankshaft member 36 is secured to the intermediate member 35 by a plurality of suitable fasteners, one of which is shown at 53 in Fig. 2. This intermediate member 35 thus forms a component part of the flywheel along with the member 36, one of these members, such as the intermediate member 35, being provided with a ring of teeth 54 adapted for engagement with a suitable starter (not shown) as will be readily understood.

The member 36 terminates rearwardly in a hub 55 of relatively small diameter, an anti-friction bearing 56 rotatably journaling this hub and providing a rear bearing for the crankshaft. The bearing 56 is carried by the rear transverse wall 57 of the crankshaft housing 23, being secured thereto at 58. The hub 55 has an axial bore or bearing 59 for rotatably journaling the forward end portion of a hollow driving shaft 60 which provides a power take-off shaft from the crankshaft B.

The clutch E comprises a driven disc 61 having a central hub 62 splined on the forward end of shaft 60. The clutch disc is provided with the circumferentially extending friction driving mats 63 adapted to be driven from the crankshaft by the driving face 64 of the crankshaft member 35 and by a pressure plate 65 operably disposed within the chamber or housing 66 provided by the crankshaft members 35 and 36. In order to yieldingly force the pressure plate 65 forwardly toward the face 64 for driving the disc 61 from the crankshaft, I have provided a circumferentially spaced series of coil springs 67, it being understood that the pressure plate 65 is adapted for movement rearwardly against the action of springs 67 for releasing the drive to the disc 61. The pressure plate is provided with a plurality of circumferentially spaced radially extending projections 68 engageable in the slots 69 of member 36 for driving the pressure plate from the member.

In order to control the operation of the clutch E so that the drive from the crankshaft B to the shaft 60 may be controlled as desired, the crankshaft intermediate member 35 has its counterweighted portion 51 thereof formed with a radially extending chamber 70 threaded at 71 (see Fig. 2—a) to receive a plug 72 carrying a pivot pin 73 for pivotally mounting the aforesaid lever 48 which has its inner end positioned for forward actuation by the front face 74 of a rod 75 rotatably disposed within the hollow bore 76 of shaft 60. The chamber 70, inwardly of plug 72, is relatively narrow in a direction transversely of the crankshaft axis to slidably fit the opposite sides of lever 48 but is elongated in a direction longitudinally of the crankshaft axis to permit lever 48 to swing about pivot pin 73. This chamber portion 70a, as shown in Fig. 2—c, opens inwardly in alignment with one of the aforesaid slots 47 of cage 46 to position the inner end of lever 48 adjacent the crankshaft axis and adjacent the inner ends of the other levers 48a. The forward end of rod 75 is slidably guided in the aforesaid cage 46 so that when the rod 75 is actuated forwardly, the lever 48 is rocked on its pivot pin 73 to move the pressure plate 65 rearwardly as will be presently more apparent. The intermediate member 35 also carries a plurality of additional levers 48a circumferentially beyond the counterweight 50, each of these levers being pivotally mounted by a pin 73a supported by a pair of brackets 72a which project forwardly from the front face of member 35, as best seen in Fig. 2—a. The inner ends of the levers 48a extend inwardly in similar manner as that described in connection with the lever 48, it being understood that all of the levers are simultaneously actuated by the thrust rod 75 to release the clutch E.

For transmitting the thrust from each of the levers 48 and 48a through the pressure plate 65, each of the lugs 68 carries a forwardly extending thrust pin 77 slidable in an opening 78 of member 35, the forward end of each pin 77 being positioned in engagement with the outer end of one of the levers. It will thus be apparent that when the rod 75 is moved forwardly, the levers 48 and 48a will be operated to thrust the pins 77 rearwardly to move the pressure plate 65 into its released position compressing springs 67 and releasing the drive from the crankshaft B to the clutch disc 61 and shaft 60.

The hollow driving shaft 60 extends rearwardly through the differential gear housing 24 and through the transmission housing 25 where this shaft provides the main driving shaft for the transmission D. The rear end of shaft 60 is rotatably journaled by a bearing 79 carried by the rear transverse wall 80 of the housing 25. Rotatably disposed within the shaft 60 and slidable axially therein are a plurality of thrust rod sections 81 contacting axially with each other and with the forward rod section 75 through the intermediary of an anti-friction rotatable ball 82, the rearmost rod section 83 having an end 84 positioned for forward thrusting movement by a lever 85 carried by a rock shaft 86 adapted for operation by the linkage 87 connected at 88 with a lever 89 pivotally supported at 90 and adapted for movement by a foot pedal 91 disposed at some convenient point for operation by the motor vehicle driver.

By forming the clutch throw-out rod in a number of sections 75, 81, 83 capable of relative rotation the rotational influences at the forward rod section 75 will be gradually reduced to zero through the sections 81, 83, whereby to eliminate or minimize rotational rubbing between the end 84 of the rearmost rod section 83 and the throwout lever 85. The rotational influences at the foremost rod section 85 are of course occasioned primarily by the engagement of face 74 with the levers 48, 48a which rotate with the crankshaft. When these levers are actuated by the forward thrusting movement of rod 75, the rotation imparted to rod 75 is progressively absorbed and dissipated through the various balls 82 and the associated rod sections 81, as will be readily understood.

The forward transverse wall 92 of the transmission casing 25 carries the anti-friction thrust bearing assembly 93 surrounding the forward end portion of a hollow transmission driven shaft 94 which is journaled internally at its rear end by an antifriction bearing 95 positioned externally of the rear end portion of shaft 60, this shaft 94 being thereby rotatably journaled at its forward end by the external bearing 93 and at its rear end by the internal bearing 95. The forward end of shaft 94 is provided with a driving pinion 96 overhanging the bearing 93 and meshing with the ring gear 97 of the differential gearing C, the gearing at 96, 97 preferably being of the hypoid type since the axis of the oppositely extending lateral driving shafts 98, 99 does not intersect the axis of shaft 94 but is preferably disposed therebelow as shown in Fig. 2. The shafts 98 and 99 are journaled in the respective support members 25a.

The ring gear 97 is adapted to drive the shafts 98, 99 through a well known differential gear set generally designated at 100, the aforesaid driving shafts 28, 29 being respectively connected to the shafts 98, 99 through the universal joints 101, additional universal joints 102 being provided between the outer ends of the shafts 28, 29 and the wheels 30, 31. The driving flanges for the universal joints 101 are illustrated at 103 in Fig. 3. Referring to Fig. 2, I have provided a speedometer drive pinion 104 carried forwardly of the pinion 96.

Referring now to my novel transmission D, I have provided an arrangement accommodating itself for use for substantially conventional speed ratio driving gears. The rear end of shaft 60 has fixed thereto a gear 105 in constant mesh with a gear 106 for driving the countershaft 107 journaled on a shaft 108 supported by the walls 80 and 92 in laterally offset relationship with respect to the shaft 60. The countershaft 107 is provided with a second speed driving gear 109; a low-speed gear 110; and a reverse gear 111 in constant mesh with a reverse idler gear 112 rotatably supported on a shaft 113 as best seen in Fig. 5.

The transmission driven shaft 94 is splined at 114 for sliding driving engagement with a low-speed and reverse gear 115 adapted to selectively mesh with gears 110 and 112 when actuated by the collar 116. The splines 114 likewise drive a gear 117 slidable by a collar 118 for engagement with the second speed countershaft driving gear 109. The gear 117 is provided with internal teeth 119 adapted to clutch with the teeth 120 carried by the gear 105 for providing a direct drive between shafts 60 and 94.

For selectively shifting the collars 116 and 118, I have provided the forks 121 and 122, respectively, these forks depending from the shifter rails 123 and 124 having spaces 125 and 126 adapted for transverse alignment when the transmission is in neutral. The rails 123 and 124 are selectively shifted by engagement of the lower end 127 of a gear shift lever 128, the shift lever end being adapted for selective movement into the spaces 125 and 126 for selective longitudinal shifting of the rails in a manner well understood in the art. The shift lever 128 is pivotally supported at 129 in the housing 130, the lever having an upwardly extending manually operating portion 131 disposed within convenient reach of the motor vehicle driver. The rails 123 and 124 are respectively slidable on rods 132 and 133, each having a series of longitudinally spaced annular notches 134 corresponding to the desired positions of adjustment of the rails. Each rail, as best seen in Fig. 6, is provided with a ball detent 135 urged upwardly by a spring 136 for yieldingly engaging the notches 134 of the rails to yieldingly locate the rails in their positions of selective adjustment.

Various modifications and changes will be apparent from the teachings of my invention, as defined in the appended claims, and it is not my intention to limit my invention to the particular details, constructions and mode of operation shown and described for illustrative purposes.

I claim:

1. In a motor vehicle drive, an engine crankshaft and supporting structure therefor, means for journalling said crankshaft adjacent its opposite ends in said supporting structure, a clutch having driving and driven clutching members, a shaft adapted to be driven by said crankshaft through said clutch, said driving clutch member being drivingly connected to said crankshaft and being disposed intermediate said crankshaft journals, said driven clutch member being drivingly connected to said driven shaft.

2. In a device of the character described, a crankshaft, a flywheel carried by the crankshaft and provided with a clutch-receiving space, a clutch operably disposed in said flywheel space, a shaft adapted to be driven from said crankshaft through the intermediary of said clutch, and journals for said crankshaft spaced from each other longitudinally of said crankshaft, one of said journals being disposed forwardly of said clutch and flywheel, the other of said journals being disposed rearwardly of said clutch and flywheel.

3. In a device of the character described, a crankshaft, a flywheel carried by the crankshaft and provided with a clutch-receiving space, a clutch operably disposed in said flywheel space, a shaft adapted to be driven from said crankshaft through the intermediary of said clutch, means for rotatably supporting said crankshaft adjacent its opposite ends, said flywheel being disposed intermediate said end bearing means, said end bearing means constituting the sole support for said crankshaft and flywheel.

4. In a motor vehicle drive, an engine crankshaft and supporting structure therefor, means for journalling said crankshaft adjacent its opposite ends in said supporting structure, a clutch having driving and driven clutching members, a shaft adapted to be driven by said crankshaft through said clutch, said driving clutch member being drivingly connected to said crankshaft and being disposed intermediate said crankshaft journals, said driven shaft extending through one of said end journalling means for driving connection to said driven clutching member.

5. In a crankshaft, a cantilever crankpin projecting from one end of said crankshaft, a flywheel at the other end of said crankshaft, a driving clutching member carried by said flywheel, means for rotatably journalling one end of said crankshaft adjacent said crankpin, and means for rotatably journalling the opposite end of said crankshaft with said flywheel and clutching member supported by and between said opposite end journalling means.

6. In a motor vehicle drive, an engine crankshaft and supporting structure therefor, a rotatable crankshaft, a pair of bearings journalling said crankshaft in said supporting structure, a crankpin spindle eccentrically carried by said crankshaft, a pair of bearings journalling said spindle in said crankshaft, one of said crankshaft bearings lying between said spindle bearings in a direction longitudinally of said crankshaft, said crankshaft having a flywheel portion thereof supported by said crankshaft bearings, and a driving clutching member carried by said flywheel.

7. In a motor vehicle drive, an engine crankshaft and supporting structure therefor, a rotatable crankshaft, a pair of bearings journalling said crankshaft in said supporting structure, a crankpin spindle eccentrically carried by said crankshaft, a pair of bearings journalling said spindle in said crankshaft, one of said crankshaft bearings lying between said spindle bearings in a direction longitudinally of said crankshaft, said crankshaft having a flywheel portion thereof supported by said crankshaft bearings, said flywheel having a chamber formed therein, and a driving clutching member carried by said flywheel and disposed in said chamber.

8. In a motor vehicle drive, an engine crankshaft and supporting structure therefor, a rotatable crankshaft, a pair of bearings journalling said crankshaft in said supporting structure, a crankpin spindle eccentrically carried by said crankshaft, said crankshaft having a flywheel at one end thereof, a driven shaft having an end portion thereof projecting axially of the crankshaft in longitudinal overlapping relationship with said flywheel end of the crankshaft, clutching members respectively drivingly connected to said flywheel and driven shaft, means for relatively moving said clutching members to control the drive from said flywheel to said driven shaft, the last said means including a plurality of levers operably connected to one of said members, and means for supporting said levers on said crankshaft with said spindle extending longitudinally between a pair of said levers.

9. In a motor vehicle drive, an engine crankshaft and supporting structure therefor, a rotatable crankshaft, a pair of bearings journalling said crankshaft in said supporting structure, a crankpin spindle eccentrically carried by said crankshaft, said crankshaft having a flywheel at one end thereof, a driven shaft having an end portion thereof projecting axially of the crankshaft in longitudinal overlapping relationship with said flywheel end of the crankshaft, clutching members respectively drivingly connected to said flywheel and driven shaft, means for relatively moving said clutching members to control the drive from said flywheel to said driven shaft, the last said means including a plurality of levers operably connected to one of said members, and means for supporting said levers on said crankshaft with said spindle extending longitudinally between a pair of said levers, said clutch member moving means further including means projecting axially through said driven shaft end portion for operating said levers.

10. In a motor vehicle drive, an engine crankshaft and supporting structure therefor, a rotatable crankshaft, a pair of bearings journalling said crankshaft in said supporting structure, a crankpin spindle eccentrically carried by said crankshaft, said crankshaft having a flywheel at one end thereof, a driven shaft having an end portion thereof projecting axially of the crankshaft in longitudinal overlapping relationship with said flywheel end of the crankshaft, clutching members respectively drivingly connected to said flywheel and driven shaft, means for relatively moving said clutching members to control the drive from said flywheel to said driven shaft, the last said means including a plurality of levers operably connected to one of said members, and means for supporting said levers on said crankshaft with said spindle extending longitudinally between a pair of said levers, said flywheel and driving clutch member being disposed intermediate said crankshaft journals.

11. In an internal combustion engine having a crankcase structure, a crankshaft journalled in said crankcase structure, a crankpin eccentrically carried by said crankshaft, counterweighting means carried by said crankshaft and lying to one side of the crankshaft axis opposite to the side thereof occupied by said crankpin, said counterweighting means producing a couple acting on said crankshaft in its longitudinal direction, counterbalancing means rotatable with said crankshaft and cooperating with said counterweighting means to oppose and substantially neutralize the effect of said couple, a shaft adapted to be driven by said crankshaft, and clutch means for drivingly connecting said crankshaft and driven shaft and including driving and driven clutching members, one of said clutching members being drivingly connected to said counterbalancing means.

12. In an internal combustion engine having a crankcase structure, a crankshaft journalled in said crankcase structure, a crank pin eccentrically carried by said crankshaft, counterweighting means carried by said crankshaft and lying to one side of the crankshaft axis opposite to the side thereof occupied by said crankpin, said counterweighting means producing a couple acting on said crankshaft in its longitudinal direction, counterbalancing means rotatable with said crankshaft and cooperating with said counterweighting means to oppose and substantially neutralize the effect of said couple, a shaft adapted to be driven by said crankshaft, clutch means for drivingly connecting said crankshaft and driven shaft and including driving and driven clutching members, and clutch operating means movably supported by said counterweighting means.

13. In an internal combustion engine having a crankcase structure, a crankshaft journalled in said crankcase structure, a crankpin eccentrically carried by said crankshaft, counterweighting means carried by said crankshaft and lying to one side of the crankshaft axis opposite to the side thereof occupied by said crankpin, said counterweighting means producing a couple acting on said crankshaft in its longitudinal direction, counterbalancing means rotatable with said crankshaft and cooperating with said counterweighting means to oppose and substantially neutralize the effect of said couple, said crankshaft having a clutch receiving chamber intermediate said counterweighting means and said counterbalancing means, a shaft adapted to be driven by said crankshaft, and a clutch operably disposed in said chamber.

14. In a built-up crankshaft, an end member, a cantilever crankpin eccentrically carried by said end member, said end member having a counterweight portion thereof diametrically opposite said crankpin, a second member spaced longitudinally of the crankshaft axis from said first member, said second member having a counterbalancing portion thereof disposed diametrically opposite said counterweight portion of said end member, and means connecting said members as a unitary structure.

15. In a built-up crankshaft, an end member, a cantilever crank pin eccentrically carried by said end member, said end member having a counterweight portion thereof diametrically opposite said crank pin, a second member spaced longitudinally of the crankshaft axis from said first member, said second member having a counterbalancing portion thereof disposed diametrically opposite said counterweight portion of said end member, a member intermediate said end and second members, said intermediate member having a counterweight portion thereof diametrically opposite said crank pin, and means connecting said members as a unitary structure.

16. In a motor vehicle drive, an engine having a crankshaft, said crankshaft having a flywheel at one end thereof formed with a terminal hollow hub, support means journalling said hub, a driven shaft projecting through and journalled in said hollow hub, and clutch means carried by said crankshaft intermediate the length thereof for driving said driven shaft from said crankshaft.

17. In a motor vehicle drive, an engine having a crankshaft, said crankshaft having a flywheel at the rear end thereof formed with a terminal hollow hub, support means externally journalling said hub, a driven shaft projecting forwardly through said support means and journalled in said hollow hub, and clutch means carried by said crankshaft intermediate the length thereof for driving said driven shaft from said crankshaft.

18. In an internal combustion engine having a crankshaft supporting structure, a crankshaft, means spaced axially of said crankshaft for journalling said crankshaft in said supporting structure, said crankshaft having a portion thereof extending outwardly from the crankshaft axis between said spaced journalling means, and a starter ring gear carried by said crankshaft portion.

19. In an engine, a crankshaft, a driven shaft, a pair of bearing means respectively rotatably journalling each end portion of said crankshaft, said crankshaft having a flywheel disposed intermediate said pair of bearing means, clutch means for operably connecting and disconnecting said crankshaft with said driven shaft, and means extending through one of said bearing means for operably controlling said clutch means.

20. In an engine, a crankshaft, bearings spaced axially of said crankshaft for journalling opposite end portions of said crankshaft, a driven shaft coaxial with said crankshaft, and clutching means operably connecting said crankshaft with said driven shaft, said clutching means including a driven disc drivingly connected with said driven shaft and disposed intermediate said bearings, said clutching means further including a clutch releasing lever disposed intermediate said disc and one of said bearings.

21. In a device of the character described, a crankshaft having a flywheel adjacent one end thereof, a supporting structure for said crankshaft having a pair of bearings respectively rotatably journalling said crankshaft axially forwardly and rearwardly of said flywheel, a driven shaft coaxial with said crankshaft and having an end portion extending axially through one of said crankshaft bearings, a driving clutch member carried by said flywheel, a driven clutch member operably connected to said driven shaft, means including a lever for controlling the drive between said driving and driven clutch members, and means for supporting said lever on said crankshaft, said lever being disposed between said crankshaft bearings.

22. In a device of the character described, a crankshaft having a flywheel adjacent one end thereof, a supporting structure for said crankshaft having a pair of bearings respectively rotatably journalling said crankshaft axially forwardly and rearwardly of said flywheel, a driven shaft coaxial with said crankshaft and having an end portion extending axially through one of said crankshaft bearings, a driving clutch member carried by said flywheel, a driven clutch member operably connected to said driven shaft, means including a lever for controlling the drive between said driving and driven clutch members, and means for supporting said lever on said crankshaft, said lever extending generally radially of the crankshaft axis between said crankshaft bearings, the inner end of said lever being disposed adjacent the crankshaft axis.

23. In a device of the character described, a crankshaft having a cantilever crankpin at one end thereof, a supporting structure having a bearing rotatably supporting said crankshaft at its other end, said supporting structure having a second bearing for rotatably supporting the crankshaft adjacent said cantilever crankpin, said crankshaft having a flywheel intermediate said bearings, said flywheel having a counterbalancing portion diametrically opposite said crankpin and spaced longitudinally of the crankshaft from said crankpin, a clutch disc engageable with said flywheel, a movable pressure plate engageable with said disc, said disc and pressure plate being disposed to one side of said flywheel, and means operably connected to said pressure plate for controlling movement thereof, said controlling means including a lever disposed at the other side of said flywheel.

24. In a motor vehicle drive, a crankshaft, bearings rotatably supporting said crankshaft adjacent opposite end portions thereof, said crankshaft having a flywheel portion adjacent one end thereof between said crankshaft end bearings, a tubular driven shaft coaxial with the axis of said crankshaft and disposed within said flywheel, said driven shaft extending axially through one of said crankshaft end bearings, a clutch structure releasably connecting said flywheel and said driven shaft, said clutch structure including a plurality of clutch operating levers having their inner ends disposed adjacent said crankshaft axis, a multiple-sectioned rod disposed axially within said tubular driven shaft and extending axially through the last said crankshaft bearing, one section of said rod being disposed within said crankshaft for actuating said lever ends, and an anti-friction element intermediate adjacent ends of each of said rod sections.

ROGER K. LEE.